ELECTROMAGNETIC-SENSITIVE RECORDING MEDIUM

Filed Aug. 24, 1966

INVENTOR.
CHARLES H. GEISLER
JOSEPH A. WIESE, JR.
BY Carpenter, Kinney & Coulter
ATTORNEYS United States Patent Office 3,554,794

Patented Jan. 12, 1971

3,554,794

ELECTROMAGNETIC-SENSITIVE RECORDING MEDIUM

Charles H. Geisler and Joseph A. Wiese, Jr., St. Paul, Minn., assignors to Minnesota Mining & Manufacturing Company, St. Paul, Minn., a corporation of Delaware Filed Aug. 24, 1966, Ser. No. 574,827
Int. Cl. H01f *10/02;* G03g *5/00*
U.S. Cl. 117—217 17 Claims

ABSTRACT OF THE DISCLOSURE

A sheet like storage medium sensitive to electromagnetic radiation comprising a backing with an imaging coating comprising a halogen-containing binder which releases atomic halogen upon exposure to electromagnetic radiation and an organic coordination complex of a magnetic metal.

This invention relates to new processes for storing and retrieving information using various forms of electromagnetic radiation, and to compositions and media useful therefor.

In one embodiment this invention is directed to a class of self-supporting sheet-like media, preferably sensitive to radiation having wavelengths below about one micron and useful for storing information, which contains at least one organic coordination complex of magnetic metal wherein oxygen is the coordinating element, such complex being dispersed in a substantially moisture vapor impermeable halogen-containing binder.

In another embodiment this invention relates to processes for storing information in media of the class indicated using a controlled beam of high electromagnetic energy such as an electron beam, a proton beam, an ion beam, an infrared beam, a laser beam, and the like.

In still another embodiment, this invention relates to processes for retrieving information from media of the class indicated using more than one form of instrumentally detectable physical property such as photon energy transmission, absorption, and/or emission, magnetic permeability, secondary electron emission ratio, and the like.

It has long been appreciated that the capacity to record and reproduce information in a given medium using a plurality of different portions of the electromagnetic spectrum is advantageous because of associated conveniences in storage density, monitoring, editing, registration and medium positioning, compatability with a variety of communications or graphic systems, etc. Although the art has heretofore known how to record (store) in, and to reproduce (retrieve or read out) information from a medium by a variety of different techniques, so far as is known to us, such prior art processes and media have usually depended upon a single form of energy for recording, and upon the same or other form of energy for readout. For example, readout heretofore has been accomplished by the generation of a signal having a characteristic energy associated with a particular portion or band width of the electromagnetic energy spectrum. By the present invention, however, there are provided media and methods whereby one can store and/or retrieve information using not merely one, but a plurality of different forms of instrumentally detectable energy either sequentially or simultaneously.

It is accordingly an object of the present invention to provide an information storage and retrieval system capable of using, sequentially or simultaneously, at least one controlled beam of high energy, e.g., a modulated electron beam for recording and readout, and capable of using more than one form of energy for readout.

Another object of this invention is to provide a process for storing and retrieving information using as a storage medium a sheet-like construction having uniformly incorporated therein at least one organic coordination complex of magnetic metal wherein oxygen is the coordinating element, dispersed in a halogen-containing binder, a particularly preferred complex being dimethoxyformatoiron (III), and a particularly preferred binder being a copolymer of vinylchloride and vinylacetate.

Another object of this invention is to provide a new sheet-like information storage medium and novel associated retrieval process.

Another object of this invention is to provide such a storage medium in which a binder is employed which both provides halide radicals and serves to stabilize the organic coordination complex against detrimental effects of atmospheric moisture.

Another object of this invention is to provide a composition useful in the aforeindicated media, such composition employing a mixture of substantially moisture vapor impermeable halogen-containing binder and at least one organic coordination complex of magnetic metal wherein oxygen is the coordinating element.

Other and further objects of this invention will become apparent to those skilled in the art from a reading of the present specification taken together with the drawings.

In accordance with the above and other objects of the invention, there has been provided a composition containing a binder which includes halogen, and certain oxygen-containing complexes of magnetic metals, which can be employed to prepare recording or storage media which when exposed to controlled high-energy beams form image-like areas corresponding to information to be stored and retrieved, which are capable of being read out in several ways.

These compositions and media form the basis for an information storage and retrieval system in which simultaneous and/or sequential storage and readout can be accomplished, using the same or different energy sources for these purposes.

Recording of information is achieved by selectively creating in the medium during impingement of such a high-energy beam thereupon an image-like pattern which corresponds to the information being recorded. The pattern differs from the adjacent background area as respects its secondary electron emission ratio, magnetic susceptibility, electrical conductivity, optical properties, and/or, possibly, other physical properties.

In the drawings:

FIG. 1 diagrams one form of medium construction useful in practicing the processes of this invention before the same is used for storing information;

MEDIA AND METHODS FOR MAKING

Figure 1:
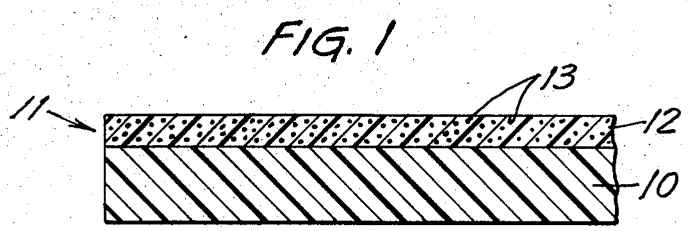

In general, storage media useful in the present invention are conveniently sheet-like and contain incorporated therein an organic coordination complex containing magnetic metal, wherein oxygen is used as the coordinating element, dispersed in a halogen-containing binder. More particularly, a single formula unit of such an organic coordination complex contains:

(a) a cation of primary valency three (i.e. trivalent) of a magnetic metal capable of having a maximum chemical coordination number of 6 and selected from the group consisting of iron and cobalt, (b) at least four oxygen atoms, three of which are each directly bonded to said metal cation through a single primary valence, and (c) three organic radicals all selected from the group consisting of carboxylates and alcoholates, each such radical being chemically bonded to said metal ion by its primary valence through oxygen, at least one of said radicals being a carboxylate and at least one of said radicals being an alcoholate.

Observe that alcoholate radicals and carboxylate radicals are attached to either hydrogen or organic residues. In simple cases, they correspond to alkoxy and acyloxy groups. The organic residues preferably are composed of carbon, hydrogen, and, optionally, oxygen. A single organic radical can have both carboxylate and alcoholate radicals. Further observe that, owing to the inherent complex nature of these organic coordination complexes, a single formula unit may contain many cations of such magnetic metals each with its own associated oxygen atoms and organic radicals, as above indicated and as set forth and illustrated in more detail hereinafter.

Preferred alcoholate radicals are those derived from lower alkanols, and a most preferred alkanol is methanol. Preferred carboxylate radicals are those derived from lower alkanoic acids, and a most preferred alkanoic acid is formic acid.

The term "lower" as used herein has reference to a molecule formula unit or radical containing less than 6 carbon atoms.

See, for discussion of "primary valence," "secondary valence," etc., the text by Therald Mueller, "Inorganic Chemistry" John Wiley & Sons, Inc., New York, 1952, pages 143, 230, 258–267, 269, etc.

By the term "magnetic" reference is had to both ferromagnetic properties (e.g., as those of iron) and ferrimagnetic properties (e.g., as those of certain of the ferrites).

These coordinate complexes are initially either diamagnetic or paramagnetic, but, in a medium construction of this invention, become, among certain other things, selectively magnetic upon exposure to a source of differential electromagnetic radiation preferably having wavelengths below about one micron and having an associated energy sufficient to initiate conversion of coordinate complex, as by creation of a magnetic substance. In the practice of this invention it is only necessary that a detectable (visually, instrumentally, or otherwise) change in magnetic or other property occur in the coordinate complex exposed to differential electromagnetic radiation. When such a magnetic substance is created, it may not be instrumentally detectable until after same is subjected to heating (i.e., heat development) as hereinafter detailed. Concurrently with heating, a color change in magnetic regions can usually be observed. However, after exposure to such source, but before such heat development, the places in such exposed medium construction where instrumentally detectable magnetic substance would appear upon heat development can characteristically be instrumentally detected by means of secondary electron emission ratio.

Instrumental detection means are known to the art and form no part of this invention. Such means as spectrophotometers, photomultipliers, Faraday balances (for magnetic permeability or susceptibility), collector rings (for secondary electron emission) and the like can be used.

One preferred class of coordinate complexes is characterized by the following generic empirical formula unit:

(1) $$M(III)(OR)_{3-x}(O_2CR')_x(H_2O)_y$$

where

R is a lower aliphatic radical;
R′ is hydrogen, or an aliphatic radical;
M(III) is a trivalent magnetic metal ion (e.g., iron(III) or $Fe^{+++}$);
$x$ is an integer greater than 0 and less than 3 (i.e., 1 or 2); and
$y$ is an integer ranging from 0 through 6 (i.e., 0, 1, 2, 3, 4, 5, or 6).

In Formula 1 the aliphatic radicals each contain less than 19 carbon atoms each. Preferred aliphatic radicals are lower alkyl radicals. More preferred complexes of Formula 1 are those wherein R is a methyl radical, R′ is either hydrogen or a lower alkyl radical, $x$ and $y$ are as defined above in reference to Formula 1 and M is iron. In general, a coordinate complex may be a mixture comprising several representatives, for example, of Formula 1 compounds with differing values of $x$ and $y$. It will be further appreciated that Formula 1 is known to those skilled in the art as a formula weight presentation or as an emperical formula, and refers to the simplest ratio of elements or radicals or ions in a compound rather than the total number of such entities in a molecule. One especially preferred material of Formula 1 is that where R is a methyl radical, R′ is hydrogen, M is iron, $x$ is one, $y$ is zero; or the compound, dimethoxyformatoiron(III), which has the empirical formula:

(2) $$(CH_3O)_2FeO\overset{\overset{O}{\|}}{C}H$$

In coordinate complexes, the alcoholate groups and/or the carboxylate groups may be interconnected with one another. An example of a class of such especially preferred complexes is ethylenedioxyformatoiron(III), a generic, empirical formula for such alcoholate group interconnected coordinate complex is (3)
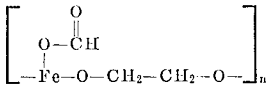

where $n$ is an integer greater than zero and typically less than about $10^{10}$ (and commonly less than about $10^3$). In such class when $n$ is 1, the complex is monoethylenedioxyformatoiron(III) whose simplest empirical formula representation is:

(4)
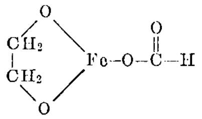

Also in such class, when $n$ is 2, the complex is bis-(ethylenedioxy)-di-formatodiiron(III), a simplest empirical formula for which is:

(5)
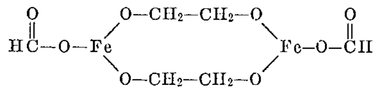

Also in such class when $n$ is greater than 2, the complex is poly(ethylenedioxyformatoiron(III)) and has, as end groups in Formula 3, hydrogen on the oxygen end, and the empirical residue $HOCH_2CH_2O$— on the iron end.

In general, coordinate complexes can be prepared either electrolytically or chemically as described hereinafter.

Coordinate complexes characteristically are moisture degradable solids which are colorless, white, yellow, red or brown in color. Owing to the complex nature of electrolytes which can be used in the preparation by the electrolytic method, as well as other process variables, the structural formulae and even the empirical formulae of many of the coordinate complexes has not been and perhaps cannot be accurately determined. However, elemental analysis and other analytical procedures support the view that all of the coordinate complexes are generically described by the description earlier in this portion of the specification.

For purposes of this invention coordinate complexes are mixed with halogen-containing binders when making storage media. Such binders are preferably substantially moisture vapor impermeable when the medium will be exposed to moist conditions in high humidity. The composition comprising coordinate complexes and halogen-containing binder is then incorporated, as by coating or the like, into a medium construction so as either to form a discrete layer therein, or to be more or less uniformly distributed therethrough. Independently of position or exact composition, the combination of coordinate complex and halogen-containing binder in a medium construction is termed the "imaging layer." All media of this invention contain such an imaging layer.

By the term "halogen-containing binder" reference is had to a cohesive non-fluid composition capable of having dispersed therein coordinate complexes. It is believed that such binders release atomic halogen under electromagnetic radiation preferably having wavelengths below about 1 micron. Such cohesive composition can itself be composed of more than one chemical entity. Thus, for example, a halogen-containing binder may contain materials to produce a composition adapted to disperse the coordination complexes and bind the composite imaging layer to a substrate or other layer. The term "halogen" has reference to chlorine, bromine, and iodine, and mixtures thereof, though chlorine and bromine are preferred, from about 20 to 80 weight percent of chlorine or the molar equivalent of bromine and/or iodine being used.

The halogen-containing binder should have low volatility when a medium construction which is to be used in a vacuum environment (as for electron beam operation) is being prepared.

While any convenient substantially moisture vapor impermeable halogen-containing binder composition can be used, it is very much preferred for purposes of this invention to employ those which are highly halogenated polymers and which release atomic halogen upon exposure to electromagnetic radiation. Such polymers should be nor-mally solid and of sufficiently high molecular weight to prevent their volatilization (i.e., above 1,000 and preferably above 10,000 in average molecular weight). Such a polymer preferably is film forming, and contains, in addition to hydrogen and carbon, from about 25 to about 73 weight percent of chlorine, or the molar equivalent amounts of bromine, or mixtures thereof.

Especially for ease of coating a substrate, such polymers desirably are soluble in conventional organic solvents, such as tetrahydrofuran, acetone, 2-butanone, chloroform, dichloromethane, toluene, etc., although other solvent systems can be used for the more difficultly soluble polymers, such as polymers and copolymers of vinylidene chloride. Vinylidene chloride copolymers with such monomers as the aliphatic acrylates (e.g., n-btuyl acrylate, methyl acrylate, ethyl acrylate, hexyl acrylate, methylmethacrylate, beta-chloroethyl arcylate, etc.), acrylonitrile, vinyl chloride, vinyl acetate, vinyl butyrate etc., which are conveniently available, are preferred highly halogenated polymers.

One especially preferred halogen-containing binder vinyl chloride and 13 weight percent vinyl acetate and available commercially from the Bakelite Corporation under the trade designation VYHH.

Ethylenically unsaturated monomers with a high halogen content such as 1,1,3,3,3-pentachloropropene-1, fluorotrichloroethylene, 1,1-difluoro-2,2-dichloroethylene, trichloroethylene, etc. copolymerized with vinyl or vinylidene chloride or bromide or with the aliphatic acrylates can also be employed. Halogenated aromatic polymers tend to be considerably less preferred than the halogenated aliphatic polymers. With the preferred vinylidene chloride polymers the chlorine concentration ranges from about 25 percent to 73 percent, preferably from about 40 to 70 percent by weight. With the vinyl chloride polymers the chlorine concentration ranges from about 35 to 55 percent, preferably from about 40 to about 50 percent by weight of the polymer. Although the halogenated polymers are desirably deposited from solution as a film on a substrate, they may also be deposited from liquid dispersion as by spraying. With those polymers which tend to decompose slowly in the presence of ordinary light and atmospheric oxygen, anti-oxidants and other stabilizers may be added to improve good storage life.

Instead of using highly halogenated polymer systems as the halogen-containing binder, a combination of halogen-free or low halogen content binder compositions with halogen-containing compounds which release atomic halogen when exposed to electromagnetic radiation can be used. such compounds may be represented by the generalized formula:

(6) $$ACX_3$$

where A is a monovalent radical selected from the group consisting of hydrogen, chlorine, bromine, iodine. alkyl and aryl, each X is selected from the group consisting of chlorine, bromine and iodine; and C, as usual, designates carbon.

Carbon tetrabromide, bromoform, or chloroform and other highly halogenated lower alkanes are members of this class, as are $CCl_4$, $C_2Br_6$, $C_2Cl_6$, $C_2HBr_5$, and $C_6H_5CBr_3$.

A halogen-containing compound of Formula 6 is conveniently used by admixing same with coordinate complex in a solution of a binder, such as nitro cellulose, and coating upon an appropriate substrate or base layer (see below). Other suitable binder materials for use with Formula 6 compounds include such synthetic polymers as polyvinyl chloride; a vinyl chloride or acrylonitrile copolymer with vinylidene chloride; cellulose derivatives, such as ethyl celluolse, methyl celluose; and the like. A host of other suitable binder materials will readily suggest themselves to those skilled in the art.

Especially when a relatively thin imaging layer is employed in a medium construction, it is convenient to employ in such construction a backing layer of preformed or separately formed material. Such a backing layer can be organic or inorganic. Examples of suitable, commonly available organic backing layers include films, nonwoven and woven structures formed of such materials as methyl cellulose, polymethyl methacrylate, polyethylene terephthalate, butadiene/styrene/acrylonitrile terpolymers, polyvinyl chloride and copolymers thereof cellulose, sisal, paper, and the like.

Examples of suitable commonly available inorganic backing layers include metal in, for instance, the form of foils (such as those of aluminum, copper, gold, foil paper laminates, or the like), and ceramic materials.

In certain types of recording and retrieving operations within the scope of this invention, it is desirable to have associated with a recording medium, in addition to an imaging layer, an electrically conductive layer. Such an electrically conductive layer serves to dissipate an electrical charge build-up, such as can occur during recording or readout with an electron beam, whereby a higher fidelity recording is typically obtained. For example, suitable electrically conductive layers can be obtained by vacuum vapor deposition of thin metal films such as aluminum or copper over a backing member or by coating a conductive particulate material (such as carbon black, metal particles, or the like in a polymeric binder) onto a backing layer.

Although it is preferred to have such a conductive layer adjacent to an imaging layer, it will be apreciated that it is convenient to have the imaging layer on one face of a backing layer and the conductive layer on the opposed face of such backing layer.

In certain types of recording medium constructions, it is sometimes desirable to include a fluorescent material or even a photoconductive material therein as in layered form particularly when fluorescent readout is contemplated.

In general, there appears to be no criticality in the arrangement of layers in a medium construction for practicing the teachings of the present invention. It will be appreciated that an electrically conductive material can be formulated with a backing material and that it is even possible to formulate homogeneous media wherein the halogen-containing binder, the coordinate complex and electrically conductive material (if one is used) are uniformly distributed throughout as a single layered homogeneous self-supporting construction. It will also be appreciated by those skilled in the art that some medium constructions are more preferred than others for reasons of processing, manufacture, ease in use, and the like.

As indicated above, media useful in practicing the present invention are usually prepared in a sheet-like form as to permit ready handling, storage, etc.

In general, in practicing the present invention, it has been found to be preferable to use as recording media those wherein there is a discrete, separate imaging layer; such layer is preferably as thin as practicable, considering the particular recording and reproducing operations for which a given medium construction is to be utilized.

In imaging layers, it is generally convenient to employ a weight ratio of halogen-containing binder to coordinate complex of from about 1:1 to 15:1. A more preferred ratio has been found to be about 10 parts binder to one part of coordinate complex, especially when one employs as the halogen-containing binder a vinyl chloride/vinyl acetate copolymer such as VYHH (above described) and coordinate complex(es) having a crystallite size range of from about 0.1 to 1.5$\mu$. (1$\mu$ is equal to $10^{-4}$ cm.)

When using a backing layer, it is generally convenient to simply coat thereon the imaging layer in the form of a non-aqueous slurry (or solution) by conventional coating techniques and thereafter to dry and store for use. In general, conventional casting and coating procedures can be used to prepare medium constructions.

RECORDING (INFORMATION STORAGE)

Briefly, to record information in accordance with the teachings of this invention using a medium as above described, one impinges a controlled beam of electromagnetic energy, preferably of high energy and preferably having a wavelength less than 1$\mu$, against one surface of such a medium.

Beam(s) having wavelengths less than 1$\mu$ are preferably employed in the practice of this invention because such wavelengths do not include infrared energy. Random application of heat energy to a medium construction during and before recording is preferably avoided.

It will be appreciated that in order to store information using a high energy beam, it is necessary in some manner to control (i.e. modulate and scan, etc.) the particular beam being used to record so as to have the capacity to differentially or selectively irradiate a surface of the storage medium so as to effect information recordation. Modulation of a beam with information to be stored can be effected by any conventional process whereby some characteristic of such a beam is varied in such a manner or to such a degree that the resulting variations or differences in beam energy as it strikes a medium being recorded upon produce selective image-like alterations in such medium.

For example, electron beams, proton beams, photon beams, ion beams, infrared beams, and laser beams can all be intensity modulated by means well known to those of ordinary skill in the art. Since the generation and control of beams of high energy is accomplished by apparatus and methods which do not form a part of the present invention and which are well known to those of ordinary skill in the art, no detailed explanation thereof is given herein. The particular type of high energy beam employed in any given instance depends, of course, upon the sensitivity and response associated with a given recording medium, upon the recording conditions, and upon a number of other variables.

It will be appreciated that, in some types of recording, it is necessary or desirable to position a recording medium in a special location or apparatus. For example, when one records upon a medium construction using an intensity modulated, scanning electron beam, it is usually convenient to place both electron gun and medium in a vacuum chamber wherein, typically, low pressures on the order of about $10^{-3}$ to $10^{-6}$ mm. Hg pressure are conventionally employed, as those familiar with electron beam techniques will readily appreciate, but pressures greater or smaller than those indicated can be used. In general, the technology for producing controlled beams of high energy is well known.

Obviously, the type of information which can be stored can vary very widely and includes, among others, video signals as well as telemetry data. In general, the processes of this invention are not limited by the nature of the information to be stored.

The exposure of a medium to variations in beam energy creates therein a generally latent image-like pattern of material which differs in secondary electron emission ratio from the surrounding background areas, such image-like pattern being a systematic characterization of the information to be recorded. Readout by secondary electron emission ratio generally is possible without heat development. Generally for other types of readout, heat development is required.

HEAT INTENSIFICATION OF BEAM GENERATED PATTERN

Either concurrently with, or following, exposure of a medium to a controlled beam of intense electromagnetic energy in a recording operation, it is preferred to subject such medium to uniform heating. Such heating, for reasons not altogether clear, generally and usually results in an intensification of the generally latent image-like pattern created by the incident controlled beam of energy.

Depending upon the nature of the medium being used, the nature of the controlled beam of energy and related factors, a generally latent image-like pattern created by a beam in a medium may or may not be substantially invisible and undetectable by such means as for example by visible light, or by magnetic susceptibility. In general, the greater the sensitivity of the medium being used (as respects its ability to respond to the particular beam of energy being employed for recording), and the greater the energy of such recording beam, the greater the likelihood of producing directly by beam exposure an image-like pattern which is visually detectable or by magnetic susceptibility.

If a visible or detectable image-like pattern is directly created during recordation, then no further treatment of the medium may be necessary or desirable before a readout operation (described hereinafter) is undertaken. However, it has usually been found desirable and in some instances actually necessary in order to make an instrumentally detectable change in some physical property such as photon energy transmission, absorption and/or emission, magnetic susceptibility, or even secondary electron emission ratio to subject a prerecorded medium to heat intensification, as by exposure to a uniform zone of thermal energy. Such intensification as a result of heating can usually be observed by mere visual inspection using a source of polychromatic light.

The temperature and duration of heating can vary. In general, lower heating temperatures require longer heating times, and vice versa, in order to develop or intensify an image pattern. Heating temperatures and times are dependent upon the degree of image pattern intensification desired or necessary.

Because of the variables involved, it is not practicable to give a single time-temperature relationship suitable for all media and beam recording conditions. However, usually temperatures below 300° C. are employed and heating times are generally less than 4 minutes. Commonly, temperatures in the range of from about 90 to 150° C. for times of less than about one minute are suitable. Because there appears to generally be a high correlation between a visible color change associated with an image-like pattern, and its magnetic properties, it is a convenient rule of thumb to heat the medium for a time sufficient to develop a visible color change image in irradiated or controlled beam-struck areas. A heat developed image is typically darker in color than background areas.

In general, it is preferred that, as respects a given medium and a given controlled beam of electromagnetic energy, the combination of recording and heat intensification (if the latter is used) be sufficient to produce an instrumentally detectable image-like pattern in such medium. Detectability, of course, will vary depending upon such things as equipment limitations, fidelity, sensitivity, etc. In any case, a medium construction capable of exhibiting a signal to noise ratio of 5:1 or greater is preferred when reading out.

INFORMATION RETRIEVAL

Briefly, retrieval from a beam exposed, and heat intensified (if necessary or desirable) prerecorded medium, as just described, is accomplished by exposing such a medium to at least one uniform field of electromagnetic energy and simultaneously detecting changes in such electromagnetic energy field created by such prerecorded medium. These energy changes can typically be in the form of photon energy, (e.g., reflected, absorbed or emitted) magnetic susceptibility variations, differential secondary electron emission ratio changes, or some combination thereof. Such processes of readout are known and the conventional methods are employed in the system of this invention.

FIGURE DESCRIPTION

Turning to the drawings, there is seen in FIG. 1 one embodiment of a medium construction of the invention. A substrate or backing layer 10 is coated on one face thereof with a relatively thin (preferably under 3 mils) imaging layer 11. The imaging layer 11 is composed of a continuous halogen-containing binder composition 12 having uniformly distributed therethrough coordinate material 13.

Figure 2:
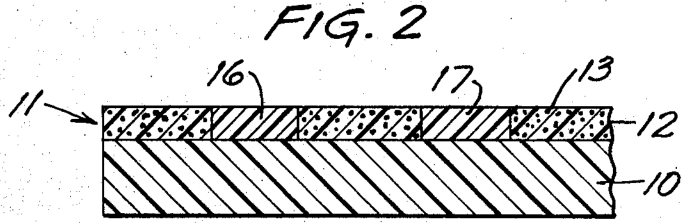
FIG. 2 is a view similar to FIG. 1 but showing one appearance of such medium construction after the same has been used for storing information.

In FIG. 2, the medium construction of FIG. 1 has been subjected to sufficient electromagnetic energy to form therein latent image areas 16 and 17. These areas or patterns can be considered to have been formed by two successive scans of an unmodulated electron beam traveling normally to the direction of the section shown.

Figure 3:
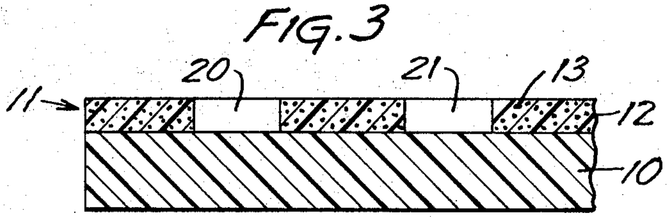
FIG. 3 is a view similar to FIG. 2 but showing diagrammatically the appearance of such medium construction after the same has been subjected to heat intensification.

In FIG. 3, the latent image shown in FIG. 2 has been subjected to uniform heating so as to intensify the latent image 16 and 17 of FIG. 2. The heat intensified image, herein designated by the respective numerals 20 and 21, are a different color to the eye than the adjacent background areas of the layer 11. The areas 20 and 21 also display a different coercivity and different secondary electron emission properties from the background area.

Typical values for the scanning electron beam for secondary electron emission readout range from about 1 to 12 kilovolts using within a range about 2 microamperes beam current with a focused beam spot diameter on the target typically of about 25 microns. Scanning times for a raster are typically those of commercial television.

The invention is further illustrated by reference to the following examples:

EXAMPLE 1

Chemical preparation of dimethoxyformatoiron(III)

A twelve liter flask containing eight liters of anhydrous methanol fitted with a mechanical stirrer, a dry air inlet bubbler, a gas exit drying tube and a one liter flask containing 320 g. (1.95 moles) $Fe(HCO_2)_2 \cdot 2H_2O$ attached with 1" I.D. rubber hose is assembled.

Dry, filtered air is bubbled through the continuously stirred solution and the powdered iron (II) formate dihydrate is added incrementally at a rate of 10 g. every 10 minutes. The colorless solution becomes first bright yellow then dark brown. Bright yellow crystals soon begin to precipitate. After 48 hours, the air flow and mechanical stirrer are stopped.

The precipitate is filtered on a Buchner funnel, washed with seven 300 ml. portions of anhydrous methanol, and transferred to a vacuum oven while still damp with methanol for drying. This compound decomposes slowly if exposed to water vapor.

The yield of dimethoxyformatoiron(III) is 269 g. (1.65 moles, 84.7%).

Calculated composition

*Analysis*.—Calcd. for $C_3H_7FeO_4$ (percent): C, 22.1; H, 4.3; Fe, 34.3. Found (percent): C, 22.1; H, 4.7; Fe, 34.4.

The infrared spectrum confirmed the sample to be dimethoxyformatoiron(III). The X-ray diffraction pattern shows two crystalline modifications present, the minor one of which is the predominant phase in dimethoxyformatoiron(III) prepared electrochemically. No significant distinction is observed in the behavior of these modifications in the practice of the arts described herein.

EXAMPLE 2

Electrochemical cell preparation of dimethoxyformatoiron(III)

Two iron electrodes each of 8 cm.$^2$ surface are immersed and spaced 6 cm. apart in 500 ml. of anhydrous methyl alcohol contained in a three-neck round-bottom flask. 3.5 ml. of formic acid are added to the methanol and a direct current potential applied to the electrodes. The potential is then adjusted until approximately 20 milliamps of current flows through the cell. The solution is stirred throughout the course of the reaction to prevent the formation of concentration gradients at electrode-solution interfaces. A slight color change can be detected within 15–20 minutes after applying potential to the electrodes. After about four hours, finely divided greenish-yellow crystals begin to precipitate. Current flow through the cell is continued for about 48 hours. Thereafter the reaction mixture is filtered and the product is recovered and dried. Solubility tests, thermal decomposition, and long-term air exposure indicated that this material behaves in all respects like the compound identified in Example 1 as dimethoxyformatoiron(III). Comparison of the infrared spectrum of this material with that for dimethoxyformatoiron(III) confirms the chemical identification.

Calculated composition

*Analysis*.—Calcd. for $C_3H_7D_4Fe$ (percent): C, 22.1; H, 4.3; Fe, 34.2; $OCH_3$, 38.2. Found (percent): C, 22.1; H, 4.3; Fe, 34.2; $OCH_3$, 38.5.

The infrared spectral evidence indicates that exposure of this material to the atmosphere for any length of time results in a slow removal of the —$OCH_3$ group, probably by hydrolysis, with the subsequent appearance of a large —OH peak at 3400 cm.$^{-1}$. This hydrolysis reaction is also accompanied by a gradual change in color from greenish-yellow for the anhydrous material to light tan for the completely hydrolyzed product. Heating the initial product compound in air results in the formation of, first, black $Fe_3O_4$, followed by formation of $Fe_2O_3$. Thermal decomposition of the material in a vacuum of $10^{-2}$ mm. Hg produces a magnetic residue composed of Fe, FeO, and $Fe_3O_4$.

In general, these results are typical for all of the material found to contain $—OCH_3$ groups. The most characteristic reaction observed with all of the materials found to contain $—OCH_3$ groups is that which occurs upon treatment of the compounds with anhydrous HCl. The rapid change of color observed in this reaction is conveniently used as a preliminary test for the presence of the $—OCH_3$ group.

When ethylene glycol is substituted for the methanol and the procedure repeated, a dark green precipitate forms which, after repeated acetone washing, becomes a greenish-yellow powder.

EXAMPLE 3

The procedure of Example 2 is repeated but 100 ml. of formic acid is added to 250 ml. of methyl alcohol over a period of about 8 hours. This compares with a 36 hour addition time for the preparation of dimethoxyformatoiron(III) in Example 2. This product is brick-red. Exposure of this product to anhydrous HCl indicated $—OCH_3$ is present; infrared spectral analysis confirms this.

EXAMPLE 4

The procedure of Example 3 is repeated but the total time of formic acid addition is about four hours. This product is grayish-white in color and responds to HCl exposure in the same manner as dimethoxyformatoiron(III).

EXAMPLE 5

The procedure of Example 2 is repeated using 20 ml. of glacial acetic acid in 500 ml. anhydrous methyl alcohol. Approximately 20 volts is applied between the two iron electrodes producing about 15 milliamps of current through the cell. The bright yellow crystalline precipitate is identified as methoxydiacetatoiron(III).

Calculated composition

*Analysis.*—Calcd. for $C_5H_9O_5Fe$ (percent): C, 29,2; H, 4.5; Fe, 27.6; $OCH_3$, 15.9. Found (percent): C, 29.2; H, 4.4; Fe, 27.3; $OCH_3$, 15.1.

Infrared spectra prepared following various intervals of atmospheric exposure show this material to be much less sensitive to hydrolysis than the dimethoxyformatoiron(III) previously obtained. Thermal decomposition and HCl exposure give essentially the same results as those obtained for dimethoxyformatoiron(III).

EXAMPLE 6

The procedure of Example 2 is repeated using 5 ml. of glacial acetic acid in 500 ml. of anhydrous methyl alcohol. The reactants are stirred during the acetic acid addition only. Approximately 20 volts is applied between the two iron electrodes producing about 15 milliamps current through the cell. A pale-green crystalline material precipitates and is identified as dimethoxyacetatoiron(III).

Calculated composition

*Analysis.*—Calcd. for $C_4H_9O_4Fe$ (percent): C, 27.2; H, 5.1; Fe, 31.4; $OCH_3$, 35.0. Found (percent): C, 27.2; H, 5.2; Fe, 35.6; $OCH_3$, 34.9.

In comparing the infrared spectrum of the product of Example 6 with that of Example 5, it is observed that only the ratios of $—OCH_3$ to $CH_3COO—$ are significantly different. The sensitivity of $(CH_3O)_2FeO_2CCH_3$ to water vapor is much more pronounced than for $$CH_3OFe(O_2CCH_3)_2$$

and is attributed to the higher percentage of $—OCH_3$ present. The thermal sensitivity of this material appears to be roughly the same as that observed for $CH_3OFe(O_2CCH_3)_2$.

EXAMPLE 7

Using the procedure of Example 2, a mixture of 4 grams of anhydrous oxalic acid in 500 ml. anhydrous methyl alcohol is prepared and electrolyzed (while stirring) between iron electrodes. The crystalline material which precipitates displays a strong infrared absorption peak at approximately 1,050 cm.$^{-1}$. This coupled with the observed reaction with HCl gas, indicates $—OCH_3$ is present in the material. Similar results are obtained when ethanol is substituted for the methanol.

EXAMPLE 8

Using apparatus like that of Example 2, but electrolyzing only anhydrous methyl alcohol using a 5 cm. spacing between iron electrodes with an applied potential of about 400 volts (5 ma.) for 72 hours, a small amount of dark brown crystalline precipitate is obtained in the bottom of the reaction flask. This material is separated from the reaction mixture, washed and dried as before, and tested for sensitivity to heat and anhydrous HCl. The presence of $—OCH_3$ as indicated by the HCl test is confirmed by a broad $—OCH_3$ infrared band (1,050 cm.$^{-1}$). The infrared bands at 1,370 cm.$^{-1}$ and 1,550 cm.$^{-1}$, identify the material as methoxydiformatoiron (III). Formic acid is probably generated by oxidation of the methanol either by air or at the anode surface.

EXAMPLE 9

Using the procedure of Example 2 but using 5 ml. of formic acid dissolved, with stirring, in 500 ml. of absolute ethyl alcohol, a potential of 20 volts is applied to the iron electrodes for a period of 72 hours. Although the reaction mixture turns brown after about 48 hours, no precipitate appears. After 72 hours the current flow through the cell is stopped. When the electrolyte is evaporated, a solid product is recovered. Diethoxyformatoiron(III) is slightly soluble in ethanol.

Similar results are obtained when acetic acid is substituted for the formic acid, except, of course, an acetate salt is formed.

EXAMPLE 10

Using the procedure of Example 2, but substituting cobalt electrodes for the iron electrodes a solution of 5 ml. of formic acid in 500 ml. of anhydrous methyl alcohol is electrolyzed. The cell is run at 10 volts for 48 hours, then at 20 volts for 36 hours. Shortly after the increase to 20 volts, a pink precipitate separates from the reaction mixture. The infrared spectral band at 1,025 cm.$^{-1}$ confirms the HCl test for $—OCH_3$. In exposing this material to HCl, the pink color of the methoxy product changes immediately to bright blue.

EXAMPLE 11

Chemical preparation of ethylenedioxyformatoiron(III)

Ten grams of iron (II) formate dihydrate (55.0 mmoles) are slurried with 200 ml. of dry ethylene glycol and dry air is bubbled through the stirred solution overnight to give a dark red solution containing a reddish precipitate.

The precipitation of the reaction mixture is completed via the addition of 600 ml. of acetone.

After aging six days, the red-brown precipitate is filtered, washed with acetone and dried in a vacuum desiccator. About 10 g. of dry product is obtained.

*Analysis.*—Calc'd for $C_3H_5FeO_4$ (wt. percent): C, 22.4; H, 3.1; Fe, 34.7. Found (wt. percent): C, 21.7; H, 4.1; Fe, 32.5.

The infrared spectrum is consistent with the ethylenedioxyformatoiron(III). An X-ray diffraction pattern shows the material to be amorphous.

EXAMPLE 12

Alternative electrochemical preparation of dimethoxyformatoiron(III)

A solution of 50 ml. of 88% aqueous formic acid in 2450 ml. of anhydrous $CH_3OH$ is purged of dissolved air by bubbling dry $N_2$ through it. It is then electrolyzed with stirring under $N_2$ with mild steel electrodes (about 8 x 2 x 0.2 cm.) for 70.7 hours at 52.8 ma. av. current (3.74 amp hrs.); the voltage at 20 ma. drops from an initial value of 99 volts to 9 volts after 70.7 hours. The solution is colorless and a small amount of white substance, probably ferrous formate, forms on the walls of the flask.

Dry air is now bubbled through the solution. It turns very dark brown almost immediately. The electrolysis is continued 6.6 hours at 20 ma. (0.13 amp hrs.) with air bubbling through the stirred dark brown solution. At this point the solution is filtered to remove 0.37 g. of a mixture of yellow crystals and metallic iron from off the electrodes. The solid is discarded and the electrolysis of the solution is resumed.

After electrolyzing an additional 16.3 hours at 54 ma. (0.88 amp hrs.) the dark brown solution contains a yellow crystalline precipitate which is recovered by filtration under dry $N_2$ in two batches designated as A and B; the latter is washed with ether and the former is not. Both are then dried in a vacuum desiccator.

The total period of electrolysis is 93.6 hours at an average current flow of 50.8 ma. for a total of 4.75 ampere hours. The yield is 3 g. of A and 7 g. of B or 10 g. $C_3H_7FeO_4$ (61.4 mmoles). The current efficiency (C.E.) calculated, assuming electrolytic oxidation to iron (II), was 68.8%.

Infrared spectra of both A and B match the reference spectrum for dimethoxyformatoiron(III) prepared chemically.

EXAMPLES 13–24

The compounds of Examples 1–12 are each formulated into a respective medium suitable for electron beam recording by the following procedure:

A mixture is prepared having the following composition:

(1) 1 gram of complex (see Formula 1);
(2) 5 grams of binder (e.g. Bakelite brand VYHH, a copolymer 87% vinylchloride and 13% vinylacetate);
(3) 100–120 ball cones of stainless steel grinding media e.g. 3/16" ball cones available from Abbot Ball Company, Hartford, Conn.); and
(4) 25–50 grams of dichloromethane binder solvent and dispersing medium.

The resulting mixture is tumbled for four hours in a glass-lined container to produce a dispersion suitable for coating. Such dispersion is then knife coated upon an aluminum foil-paper laminate. This laminate comprises an aluminum foil about 1 mil thick bonded to a paper backing averaging two mils thick. The resulting aluminum foil-paper laminate is transversely electrically conductive to the extent of at least about $10^{-3}$ mhos per square. The coating of such laminate with such dispersion is accomplished by passing the aluminum or obverse side of the paper over a knife coating apparatus in such a manner that a coating is deposited on the aluminum side of the laminate while such laminate is in a vertical position. Immediately on coating, the aluminum coated side is moved so that such coated side is dried facing downwards. By so coating, the gravitational field tends to bring the Formula 1 compound near the surface of the coating, a condition which is desirable for electron beam recording owing to the relatively low penetrating power of electron beams of moderate current density. The coating thickness of the web coated dispersion is such that after drying in air the dry film thickness is about 0.1 mil. The final particle size of the Formula 1 compound in the medium is dependent on the initial Formula 1 compound particle size and on the grinding time.

In general, it is believed that a fine particle size of Formula 1 compound (0.1 to 1.5 microns average diameter) gives films yielding best image quality. There appears to be a direct correlation between image quality and particle size down to a particle size of about 200 A.

Table I below provides a number designation for media prepared as described above:

Table I.—Examples of EBR media of this invention

| Medium example number: | Contains complex (Formula 1) of the following example number |
|---|---|
| 13 | 1 |
| 14 | 2 |
| 15 | 3 |
| 16 | 4 |
| 17 | 5 |
| 18 | 6 |
| 19 | 7 |
| 20 | 8 |
| 21 | 9 |
| 22 | 10 |
| 23 | 11 |
| 24 | 12 |

EXAMPLES 25–33

Using the procedure described for Examples 13 through 24 but using only dimethoxyformatoiron(III) as the complex in admixture with the binder, a series of media are prepared to determine an optimum ratio of Formula 1 compound to binder. Table II below summarizes the media so prepared.

TABLE II

| Example | Binder | Ratio of DMFFeIII [1] compound to binder | Solvent | Backing |
|---|---|---|---|---|
| 25 | VYHH [2] | 1:10 | 15 ml. methylene chloride | Polyester. [3] |
| 26 | VYHH | 1:10 | 20 ml. methylene chloride | Polyester. |
| 27 | VYHH | 1:5 | 15 ml. methylene chloride | Do. |
| 28 | VYHH | 1:5 | Toluene and 2-butanone | Do. |
| 29 | VYHH | 1:10 | Methylene chloride | Aluminum-paper laminate. [4] |
| 30 | VYHH [5] | 1:10 | do | Aluminum-paper laminate. |
| 31 | Pliolite S-7 [6] | 1:10 | Toluene | Do. |
| 32 | VYHH | 1:1 | Methylene chloride | Polyester. |
| 33 | VYHH | 1:1 | do | Aluminum-paper laminate. |

[1] Dimethoxyformatoiron (III).
[2] VYHH is a copolymer 87% polyvinylchloride and 13% polyvinylacetate (Bakelite).
[3] The polyester used is a sheet of polyethylene tereaphthalate having a thickness of about 2 mils.
[4] The aluminum-paper is a laminate comprising 1 mil Allaminate on 2 mil paper.
[5] This binder comprises a mixture that not only contains VYHH but also zinc oxice to an extent that a white background is obtained.
[6] Pliolite S-7 is styrene/butadiene resin (Goodyear).

EXAMPLES 34–54

Using a suitable electron beam recording (EBR) apparatus, information is recorded upon each of the media above described in the following manner:

Each medium of Examples 13–33, respectively, is placed in the vacuum chamber with an electron beam generating and controlling apparatus wherein the pressure is maintained below about $10^{-3}$ torr. An electron beam is employed which has a circular cross-sectional diameter of about 25 microns in the target region where the medium being recorded upon is located. The beam has an accelerating potential of about 25 kilovolts and a resulting target current of about 40 microamperes. Each medium is exposed to three different recording conditions as follows:

(1) a conventional commercial television frame (the duration of a single field generation being 0.0167 sec.), i.e. two interlaced video fields,
(2) 15 TV frames,
(3) 30 TV frames.

After such exposure, each medium sample is removed from the vacuum chamber and subjected to uniform heat to about 150–250° C. for a time sufficient to cause a visible image to develop in each exposed site. After an image is developed, further heating may destroy the image.

In each medium sample when a visible image was developed, such recordation was then subjected to the following conditions of readout, successively:

(1) visible photon emission (absorption) ratio,
(2) secondary electron emission ratio, and
(3) magnetic susceptibility ratio.

The results are tabulated in Table III below.

In this table if readout is observed only after at least 30 TV frames exposure, the image quality is rated "good"; if readout is observed only after 15 TV frames or greater exposure, the image quality is rated "better"; and if readout is observed only after 1 TV frame or greater exposure, the image quality is rated "best."

TABLE III.—EXAMPLES OF EBR AND READOUT

| | | Evaluation of image quality on EBR [1] | | |
|---|---|---|---|---|
| | Medium of Example No. | Visible photon emission (absorption) ratio readout | Secondary electron emission ratio readout | Magnetic susceptibility ratio readout |
| Example No.: | | | | |
| 34 | 13 | Best | Best | Best. |
| 35 | 14 | Better | Better | Better. |
| 36 | 15 | Good | Good | Good. |
| 37 | 16 | do | (2) | (2). |
| 38 | 17 | do | Good | Good. |
| 39 | 18 | do | (2) | (2). |
| 40 | 19 | do | Good | Good. |
| 41 | 20 | do | (2) | (2). |
| 42 | 21 | do | (2) | (2). |
| 43 | 22 | do | (2) | (2). |
| 44 | 23 | Best | Best | Best. |
| 45 | 24 | do | do | Do. |
| 46 | 25 | Better | Better | Good. |
| 47 | 26 | do | do | Do. |
| 48 | 27 | do | Good | Do. |
| 49 | 28 | Good | do | Do. |
| 50 | 29 | Better | Best | Do. |
| 51 | 30 | Best | do | Do. |
| 52 | 31 | (2) | (2) | (2). |
| 53 | 32 | (2) | (2) | Best. |
| 54 | 33 | (2) | (2) | Do. |

[1] EBR indicates electron beam recording.
[2] There was little or no readout observed.

EXAMPLES 55–59

To demonstrate the effect of increasing concentration of halogen in halogen-containing binder for relatively constant quantities of dimethoxyformatoiron(III), a series of media are prepared using the method described above in Examples 13–24, except that varying amounts of carbon tetrabromide are added to the dispersion before coating. After coating and drying, each resulting medium is subjected to an electron beam recording operation as described in Examples 34–54 with an electron beam. The results are summarized in Table IV below:

TABLE IV

| | DMFF,[1] g. | VYHH,[2] g. | $CBr_4$,[3] g. | Solvent,[4] cc. |
|---|---|---|---|---|
| Example No.: | | | | |
| 55 | 1.0 | 1.0 | 0.5 | 15 |
| 56 | 1.0 | 2.0 | 0.5 | 15 |
| 57 | 1.5 | 1.0 | 0.5 | 15 |
| 58 | 1.0 | 5.0 | 1.0 | ~25 |
| 59 | 0.5 | 5.0 | 1.0 | ~25 |

[1] Amount of dimethoxyformatoiron(III) in medium.
[2] VYHH is as identified in Table II. This column indicates the amount of such copolymers used in the medium construction in admixture with dimethoxyformatoiron(III).
[3] This column indicates the amount of carbon tetrabromide used in combination with dimethoxyformatoiron(III) and vinylchloride/vinyl acetate copolymer.
[4] This column indicates the amount of solvent added to a starting composition. In all cases the solvent is dichloromethane.

To demonstrate the increased sensitivity resulting from addition of carbon tetrabromide to medium constructions, the medium constructions of Examples 55–59 are recorded upon using an electron beam having a 10 kv. accelerating potential, said beam being equipped to produce a single focused spot about 25 microns in diameter having a variable current density as summarized below:

| | Beam current, $\mu$ amps. | Exposure time, sec. |
|---|---|---|
| 1st exposure | 3 | 0.033 |
| 2nd exposure | 6 | 0.033 |
| 3rd exposure | 3 | 0.1 |

Heat intensification using a 300° C. heated air blower is carried out. The results indicate that best quality images are obtained with an electron beam having 10 kv., 6$\mu$ amps and 33 milliseconds exposure time, but that heat intensification is required for development of a black (high contrast) image.

Addition of carbon tetrabromide increases the sensitivity of media for direct electron beam recording so that a lower beam energy can be used to produce images of intensity equivalent to that obtained with higher beam energies by increasing the quantity of carbon tetrabromide in a given medium. Carbon tetrabromide addition also tends to reduce beam exposure time required to produce an image of equivalent intensity to that achieved with lesser amounts of carbon tetrabromide. During the heat intensification step, the carbon tetrabromide volatizes.

EXAMPLES 60–69

To determine an optimum ratio of dimethoxyformatoiron(III) to halogen-containing binder so as to have media of good shelf life with and without the addition of carbon tetrabromide, a series of media are prepared. Compositions of dimethoxyformatoiron(III) and halogen-containing binder are prepared as detailed in the following table V using the procedure of Examples 13–24.

TABLE V [5]

| | DMFF,[1] g. | VYHH,[2] g. | $CBr_4$,[3] g. | Solvent,[4] cc. | Ball milling time, hrs. |
|---|---|---|---|---|---|
| Example No. | | | | | |
| 60 | 1.0 | 1.0 | | 15 | 3.5 |
| 61 | 1.0 | 1.5 | | 15 | 3.5 |
| 62 | 1.0 | 2.0 | | 15 | 3.5 |
| 63 | 1.0 | 3.0 | | 15 | 3.5 |
| 64 | 1.0 | 4.0 | | 20 | 3.5 |
| 65 | 1.0 | 5.0 | | 20 | 3.5 |
| 66 | 0.5 | 5.0 | | 20 | 4.5 |
| 67 | 1.0 | 15.0 | | 30 | 4.5 |
| 68 | 0.5 | 5.0 | 1.0 | 25 | 4.5 |
| 69 | 1.0 | 5.0 | 1.0 | 25 | 4.5 |

[1] Amount of dimethoxyformatoiron(III) in medium.
[2] VYHH is as defined in Table II. This column indicates the amount of such copolymer used in the medium construction in admixture with dimethoxyformatoiron(III).
[2] This column indicates the amount of carbon tetrabromide used, if any, in combination with dimethoxyformatoiron(III) and vinylchloride/vinyl acetate copolymer.
[4] This column indicates the amount of solvent added to a starting composition. In all cases the solvent is dichloromethane.
[5] Each of the above mixtures is placed in a vial containing steel ball cones and then each vial is ball milled for the time indicated in the table above. Thereafter the contents of each vial is immediately coated onto an aluminum foil paper laminate with a knife coater and dried face down in the manner described in Examples 13–24.

When each medium so prepared is immediately exposed to a 20 kv. 60μ amp electron beam for a time of one commercial TV field a generally latent image-like pattern of material which differs in secondary electron emission ratio from the surrounding background areas is formed in each medium which is made visible by heat development in each medium. This pattern is capable of readout by any of the aforementioned means.

The results indicate, generally, that carbon tetrabromide addition enhanced medium sensitivity towards the electron beam and that the addition of carbon tetrabromide shortened the heat intensification step time required to develop a visible image following beam exposure.

When each medium so prepared is stored under conditions of 25° C. and 35% relative humidity for six weeks and then is exposed to a 20 kv. 60μ amp electron beam for a time of one commercial TV field, only in the media of Examples 66 and 67 is there satisfactory recordation, and the medium of Example 66 is superior to the medium of Example 67 for such purposes.

What is claimed is:

1. A sheet-like storage medium sensitive to electromagnetic radiation comprising a backing layer and an imaging layer laterally uniformly distributed relative to one face of said backing layer, said imaging layer comprising a coating of a substantially moisture vapor impermeable halogen-containing binder having dispersed therein at least one organic coordination complex of a magnetic metal wherein oxygen is the coordinating element, said binder being a material which releases atomic halogen upon exposure to electromagnetic radiation, and said organic coordination complex is further characterized by (a) a cation of primary valency three of a magnetic metal capable of having a cemical coordination number of 6 and selected from the group consisting of iron and cobalt, (b) at least four oxygen atoms, three of which are each directly bonded to said metal cation through a single primary valence, and (c) three organic radicals all selected from the group consisting of aliphatic carboxylates and alcoholates, each such radical being chemically bonded to said metal ion by its primary valence through oxygen at least one of said radicals being a carboxylate and at least one of said radicals being an alcoholate.

2. The medium of claim 1 wherein said backing layer is electrically conductive.

3. The medium of claim 1 wherein said halogen-containing binder is a normally solid, highly halogenated polymer having a molecular weight of at least about 1,000 and having at least 25 weight percent of labile halogen selected from the group consisting of chlorine and bromine.

4. The medium of claim 1 wherein said imaging layer has a thickness less than about 3 mils.

5. The medium of claim 1 wherein the weight ratio of said halogen-containing binder to said organic coordination complex ranges from about 1:1 to 15:1.

6. The medium of claim 1 wherein said binder contains from about 25 to 73 weight percent of chlorine, or the molar equivalent amount of bromine, or mixtures thereof.

7. The medium of claim 1 wherein the halogen-containing binder is a copolymer of vinyl chloride and vinyl acetate.

8. The medium of claim 1 wherein said coordination complex is dimethoxyformatoiron(III).

9. The medium of claim 1 wherein said coordination complex is monoethylenedioxyformatoiron(III).

10. The medium of claim 1 wherein said coordination complex is bis(ethylenedioxy)-diformatodiiron(III).

11. The medium of claim 1 wherein said coordination complex is an ethylenedioxyformatoiron(III) complex.

12. The medium of claim 1 containing in addition to said backing layer and said imaging layer an electrically conductive layer relative to and in contact with the other face of said backing, the latter layer and said backing layer being in the form of a laminate with said imaging layer being coated on the exposed surface of said electrically conductive layer of the laminate.

13. The medium of claim 1 wherein the relative amounts of said organic coordination complex and said binder are sufficient to provide a detectable image in said imaging layer when said medium is exposed to said electromagnetic radiation.

14. The medium of claim 12 wherein said backing layer comprises paper and said electrically conductive layer comprises aluminum.

15. The medium of claim 1 wherein said organic coordination complex is characterized by the following generic empirical formula unit:

$$M(III)(OR)_{3-x}(O_2CR')_x(H_2O)_y$$

where

R is a lower aliphatic radical;
R' is hydrogen, or an aliphatic radical;
M(III) is a trivalent magnetic metal ion;
$x$ is an integer greater than 0 and less than 3; and
$y$ is an integer ranging from 0 through 6.

16. A sheet-like storage medium sensitive to electromagnetic radiation comprising a paper-aluminum laminate or polyethylene terephthalate backing layer and an imaging layer coated on one face of said backing layer, said imaging layer comprising a coating of a substantially moisture vapor impermeable of normally solid, highly halogenated polymer binder having a molecular weight of 1,000 and having at least 25 weight percent of labile halogen selected from the group consisting of chlorine and bromine and, dispersed in said binder, at least one organic coordination complex selected from the group consisting of dimethoxyformatoiron(III), monoethylenedioxyformatoiron(III), bis(ethylenedioxy)-diformatodiiron(III), and ethylenedioxyformatoiron(III).

17. The medium of claim 16 wherein said binder is a copolymer of vinyl chloride and vinyl acetate, and wherein the weight ratio of said binder to said organic coordination complex is in the range of 1:1 to 15:1.

References Cited

UNITED STATES PATENTS

| | | | |
|---|---|---|---|
| 3,139,354 | 6/1964 | Wolff | 117—235 |
| 3,190,748 | 6/1965 | Landgraf | 252—62.54 |
| 3,278,441 | 10/1966 | Manuel et al. | 117—235 |
| 3,425,867 | 2/1969 | Stillo | 117—230 |

WILLIAM D. MARTIN, Primary Examiner

B. D. PIANALTO, Assistant Examiner

U.S. Cl. X.R.

117—1.7, 36.8, 201, 216, 218, 235, 239; 161—220, 413, 251

UNITED STATES PATENT OFFICE
CERTIFICATE OF CORRECTION

Patent No. 3,554,794 Dated January 12, 1971

Inventor(s) Charles H. Geisler and Joseph A. Wiese, Jr.

It is certified that error appears in the above-identified patent and that said Letters Patent are hereby corrected as shown below:

Column 5, line 39 "nor-mally" should read -- normally --.
line 53, "btuyl" should read -- butyl --.
line 59, after "binder" insert -- composition is a copolymer made from 87 weight percent --.

Column 10, line 63, in the formula "$D_4$" should read -- $O_4$

Column 11, line 42, "29.2" should read -- 29.3 --.

Column 14, in Table II, in footnote 5, "oxice" should read -- oxide --.

Column 17, line 35, "cemical" should read -- chemical --.

Signed and sealed this 4th day of May 1971.

(SEAL)
Attest:

EDWARD M.FLETCHER,JR.
Attesting Officer

WILLIAM E. SCHUYLER, J
Commissioner of Patent